United States Patent Office 3,109,712
Patented Nov. 5, 1963

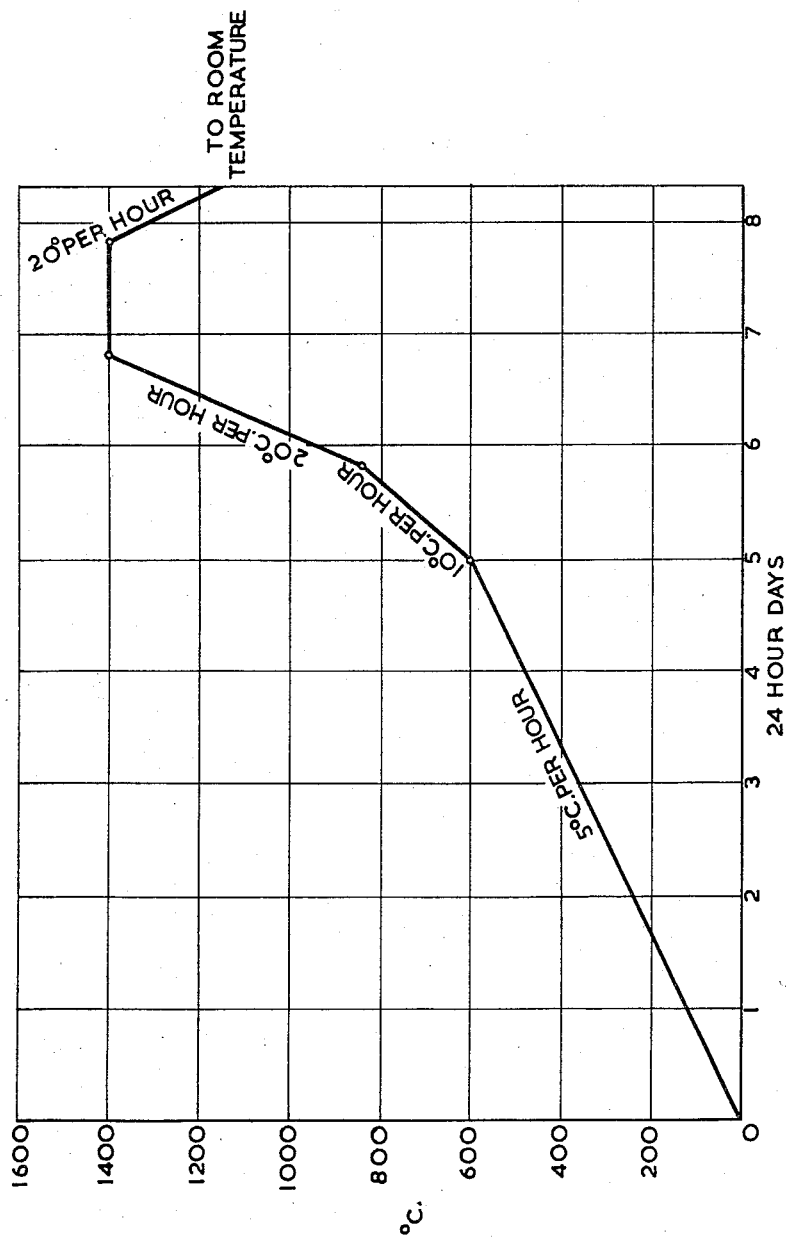

3,109,712
BODIES AND SHAPES OF CARBONACEOUS MATERIALS AND PROCESSES FOR THEIR PRODUCTION
Bernard Redfern, Greens Norton, England, assignor to The Plessey Company Limited, London, England, a British company
Filed Jan. 9, 1961, Ser. No. 81,646
Claims priority, application Great Britain Jan. 11, 1960
5 Claims. (Cl. 23—209.2)

The present invention is concerned with carbonaceous materials and bodies and shapes produced therein and with processes for the production thereof. More particularly, the present invention is concerned with hard, substantially impermeable, vitreous, chemically-resistant forms of carbon which may additionally contain small amounts of oxygen and hydrogen.

The carbonaceous materials and bodies produced therein are obtained by the thermal degradation in vacuo or in an inert or reducing atmosphere, e.g. argon, hydrogen, carbon monoxide, of materials and/or bodies of resinous materials produced by polymerisation or copolymerisation or condensation of phenols and aldehydes.

These resinous materials are produced by reacting compounds containing chemically combined carbon, oxygen and hydrogen to form polymers or resinous materials containing chemically combined carbon, oxygen and hydrogen, usually in the presence of a catalyst e.g. sodium hydroxide, oxalic acid; but they can also be produced without the addition of a catalyst.

These polymers do not depolymerise substantially when heated slowly in vacuo or in an inert or reducing atmosphere up to temperatures of 150° C.–>3000° C. These carbonaceous materials formed by the thermal degradation of polymers and resinous materials and bodies produced from these, are substantially impermeable, are not graphitic, are substantially no-absorptive, e.g. carbon residues produced by firing phenol formaldehyde resins to 1600° C. are amorphous by X-ray analysis and do not absorb and are not affected by bromine, e.g. specimens immersed in liquid bromine for 16 hours showed no gain or loss of weight.

Thus, according to the present invention, there are provided processes for the production of hard, lustrous, substantially impermeable vitreous, chemically-resistant bodies consisting substantially of carbon, wherein phenol-aldehyde resin bodies are heated in vacuo or in an inert or reducing atmosphere in such a manner as to allow the transition of the polymer or resin to carbon to take place without disruption or distortion of the original form of the polymer or resin bodies, the product obtained consisting of carbon and, at most, 3% by weight of hydrogen. It is to be understood that although the original form of the resinous bodies are not disrupted or distorted there is an overall regular volume reduction e.g. in one instance there was a volume reduction of 48.8%. The volume reduction, and certain other properties are dependant upon the thermal gradient, the maximum firing temperature and the time at maximum temperature.

The phenol-aldehyde resins used may be of the resole or novolac types, but other phenol-aldehyde resins may also be used, such as those obtained from cresols and xylenols by reaction with, e.g. formaldehyde or furfuraldehyde. Suitable starting materials can also be prepared by the polymerisation, copolymerisation or condensation of phenols and aldehydes without the addition of a catalyst.

The resins or polymers or resinous materials can either be processed from the liquid phase in which case they must be enclosed in suitable containers, e.g. fused quartz moulds, or alternatively they can be cured i.e. heated until they solidify, at relatively low temperatures, e.g. a resole type phenol formaldehyde resin ratio 1:1.2, sodium hydroxide catalysed having a viscosity at 25° C. of 20 poises, was cured in a glass mould for 24 hours at 90° C. and the glass mould removed. Another alternative method of preparing solid resin bodies is to heat the liquid resinous materials at low temperatures, e.g. 90° C. and pressure-mould the resultant solid at relatively low temperatures whereupon they become plastic and cure to a solid, e.g. a resole type phenol formaldehyde resin in ratio 1:1.2, sodium hydroxide catalysed having a viscosity at 25° C. of 20 poises, part cured at 90° C. for 8½ hours, is reduced to granules or powder by any suitable method, e.g. mechanical crushing, and is hot pressed in a steel mould maintained at a temperature of 200° C. at a pressure of 5 tons per square inch, these conditions to be maintained for e.g. 15 mins. for a finished specimen thickness of 0.10" in direction of pressing.

The heating or carbonisation of the thus formed bodies of resinous material may be carried out initially in vacuo or in an inert or reducing atmosphere at a gradient of 5° C. per hour until a temperature of 600° C., is reached, the heating gradient then increased to 10° C. per hour until a temperature of 825° C. is reached, the heating gradient again increased to 20° C. per hour until a temperature of at least 1400° C., preferably at least 1600° C., is reached and this temperature then maintained for 24 hours after which the product obtained is cooled slowly to room temperature at a gradient of 20° C. per hour.

X-ray diffraction studies of the carbonaceous products obtained according to the present invention show that they possess an amorphous (micro-crystalline) structure. The materials so formed are hard enough to cut glass, are thermally conductive and are extremely resistant to chemical attack. The density of the materials obtained is lower than that of graphite carbon and is dependent upon the nature of the resins used as starting materials.

I have also found that when the maximum firing temperature is less than 1600° C. the products obtained may contain up to 3% by weight of hydrogen and have additional useful properties, such as electrical resistivity and thermoelectric properties. The products also have a vitreous appearance.

The following examples are given for the purpose of illustrating the present invention.

*Example 1*

A high purity liquid resin of the resole type is formed into the desired shape by casting in glass moulds. The moulds are initially heated in a drying oven at 90° C. for 3½ hours and are then heated subsequently in accordance with a heating schedule whereby the temperature of the moulds is progressively increased at a temperature gradient of 5° C. per hour up to a maximum temperature of 200° C. The thus heated moulds are then cooled to room temperature. The cast shapes are removed from their moulds, packed in high purity graphite powder or flake in a refractory container and heated in vacuo or in an inert or reducing atmosphere e.g. argon, nitrogen or carbon monoxide, in order to carbonise the shapes. The re-heating of the articles in the above manner is in accordance with the heating schedule which is shown in the accompanying drawing. It will be seen that the heating is carried out initially at a rate of 5° C. per hour until a temperature of 600° C. is reached, the rate of heating is then increased to 10° C. per hour until a temperature of 825° C. is attained, the temperature gradient is then again increased to 20° C. per hour and the heating continued until a temperature of at least 1400° C. is reached. The articles are maintained at about this latter temperature for a period of about 24 hours and then allowed to cool at a temperature gradient of 20° C. per hour.

*Example 2*

Articles produced from high purity phenolic moulding powder by hot pressing at 150°–200° C. and at 5 tons per square inch for 15 minutes, such as laboratory boats, 2½" in length x ¾" width x .0625" wall thickness, another disc 1" diameter x 0.125" thick, are placed in high purity graphite containers fitted with lids filled with high purity synthetic graphite powder.

These sealed containers are then placed in a furnace and subjected to the heating cycle as used in Example 1. The measurements of the finished products used as examples above are as follows: Laboratory boat finished size— 2.1" length x 0.63" width x 0.0525" wall thickness. Disc finished size—0.84" diameter x 0.105" thickness.

*Example 3*

A high purity liquid resin prepared by reacting at 80° C. phenol and formaldehyde (40% solution in the water) in ratio of 1:1.25, with no catalyst addition, is run into glass moulds and heated for 96 hours in an oven at 90° C., the glass moulds are then removed and heating is carried on for a further 72 hours, the temperature being raised gradually to a maximum of 200° C. These are then allowed to cool to room temperature and are carbonised for example as in Example 1.

Articles made by the process of Example 3 include (a) Tubes closed one end: 6.50" length x 0.901" diameter x 0.242" wall thickness when fired to a maximum temperature of 1700° C.
(b) Tubes closed one end: 8.1875" length x 0.592" diameter x 0.18" wall thickness when fired to a maximum temperature of 900° C.
(c) Solid cylinders: 0.375" diameter x 0.50" length when fired to a maximum temperature of 1600° C.
(d) Solid cylindrical rods: 0.10" diameter and up to 0.25" diameter x 12.00" length fired to maximum temperature of 900° C. 2000° C., more than 3000° C. (carbon arc).

*Example 4*

A high purity liquid resin prepared by reacting at 80° C. phenol and formaldehyde (40% solution in the water) in ratio of 1:2.5, with no catalyst addition, is run into shallow trays of stainless steel 0.5" in depth and heated in an oven for 72 hours and cooled to room temperature. The solid resinous material is broken up into suitable granules or powder, or cut up into preforms, and pressure moulded in a chromium plated steel mould example: at a temperature of 150° C., at a pressure of 10 tons per square inch for 15 minutes' duration where the moulded thickness required is 0.10", in the direction of pressing. For thicker sections this time has to be increased. When extracted from the mould these solid moulded bodies should be transparent and pale yellow or amber in colour. These can be carbonised for example as in Example 1.

Articles produced in accordance with the process according to Examples 2 and 4 include (a) Solid discs: 0.84" diameter x 0.105" thickness when fired to a maximum temperature of 2000° C.
(b) Laboratory boats: 2.1" length x 0.63" width x 0.0525" wall thickness when fired to a maximum temperature of 2000° C.

*Example 5*

A solid resin moulding powder of the novolac type is produced by reacting together phenol and formaldehyde (40% solution in water) in the ratio of 1:0.8 with oxalic acid catalyst crushing the resultant solid resin and blending with powdered hexamethylene-tetramine in ratio of 90:10. This is then hot pressed in a chromium plated steel mould at a temperature of 150° C. at a pressure of 5 tons per square inch for 5 minutes duration where the finished specimen thickness is 0.10" in the direction of pressing. These moulded bodies are composed of carbon, oxygen, hydrogen and nitrogen and can be carbonised for example as in Example 1.

Hard, lustrous, substantially impermeable, vitreous, chemically resistant bodies, consisting substantially of amorphous, non graphitic carbon prepared by the processes of the present invention and having been heated to at least 1600° C. in sections for example of 0.375" thickness have the following properties:

(a) Transverse strength more than 25,000 pounds per square inch.
(b) No loss in weight in pure oxygen at 600° C.
(c) X-ray diffraction shows the structure to be amorphous, nongraphitic carbon.
(d) No gain or loss in weight in liquid bromine or bromine vapour after 16 hours' immersion.
(e) Hardness as determined by scratch method approximately 7 Mohs.
(f) Electrical resistance of specimen of phenol formaldehyde resin 1:1.2 ratio fired to 1600° C.=0.0225 ohm cms.
(g) Density 1.4 to 1.6 gms. per cubic cm.
(h) Elasticity by comparison method, similar to borosilicate glass.
(i) Appearance of black glass and exhibiting a conchoidal fracture when subjected to mechanical breakage.
(j) Thermal conductivity of 0.20 J. cms./° C./second/cm².

The material in accordance with the present invention has a large number of uses including:

Chemically resistant vessels; mechanical uses; electrical contacts; electrodes; refractory uses, bearings; heat exchangers; filler in other materials; and as a matrix for bonding other materials.

What I claim is:

1. A process for the production of hard, lustrous, substantially impermeable, vitreous, chemically-resistant bodies consisting substantially wholly of carbon from pre-shaped resinous bodies comprising cured phenol aldehyde, wherein the resinous bodies are heated at a gradient of 5° C. per hour until a temperature of 600° C. is reached, the heating gradient is then increased to 10° C. per hour until a temperature of 825° C. is reached, the heating gradient again increased to 20° C. per hour until a temperature of at least 1400° C. is reached and this temperature maintained for 24 hours after which the product obtained is cooled to room temperature at a gradient of 20° C. per hour.

2. A process according to claim 1, wherein the maximum temperature attained is at least 2000° C.

3. A process according to claim 1, wherein the maximum temperature attained is at least 3000° C.

4. A process according to claim 1, wherein the starting material used is a resole type phenol aldehyde resin.

5. A process according to claim 1, wherein the starting material used is a novolac type of phenol aldehyde resin.

References Cited in the file of this patent

UNITED STATES PATENTS

| | | |
|---|---|---|
| 1,156,509 | Weintraub et al. | Oct. 12, 1915 |
| 2,609,256 | Baker et al. | Sept. 2, 1952 |
| 2,697,028 | Baker et al. | Dec. 14, 1954 |
| 2,758,940 | Baker et al. | Aug. 14, 1956 |
| 2,765,354 | Carpenter et al. | Oct. 2, 1956 |

FOREIGN PATENTS

| | | |
|---|---|---|
| 329,652 | Great Britain | May 21, 1930 |